United States Patent [19]

Stievenart et al.

[11] 4,329,589
[45] May 11, 1982

[54] DEVICE FOR POSITIONING RADIOGRAPHIC CASSETTES

[75] Inventors: Emile F. Stievenart, Hoboken; Hendrik S. Plessers, Wychmaal; Julianus J. Hellemans, Kontich; Georges J. Neujens, Merksem, all of Belgium

[73] Assignee: AGFA-GEVAERT N.V., Mortsel, Belgium

[21] Appl. No.: 134,554

[22] Filed: Mar. 27, 1980

[30] Foreign Application Priority Data

Mar. 30, 1979 [GB] United Kingdom ............... 7911118

[51] Int. Cl.$^3$ ............... G11B 1/00; B65H 1/22; B65G 47/00
[52] U.S. Cl. ............... 250/468; 198/345; 271/164
[58] Field of Search ............... 250/468, 470, 521; 354/276, 312, 319; 271/162, 164, 236, 245, 246; 198/345, 781, 857

[56] References Cited

U.S. PATENT DOCUMENTS

| 2,910,293 | 10/1959 | Kelchner | 271/236 |
| 4,032,137 | 6/1977 | Katayama et al. | 271/164 |
| 4,092,022 | 5/1978 | Preuss et al. | 271/236 |
| 4,221,288 | 9/1980 | Rae | 198/789 |
| 4,227,089 | 10/1980 | Plessers et al. | 250/468 |

FOREIGN PATENT DOCUMENTS 1653  5/1979  European Pat. Off. ............ 250/468

Primary Examiner—Alfred E. Smith
Assistant Examiner—Carolyn E. Fields
Attorney, Agent, or Firm—William J. Daniel

[57] ABSTRACT

An apparatus for positioning a radiographic film cassette at an operating station uses friction-coupled drive means to urge the cassette toward a front stop. Sensing means associated with the front stop then actuates a pusher which urges the cassette toward a side stop. The cassette cover is automatically opened when the cassette is correctly positioned against both stops.

9 Claims, 7 Drawing Figures

DEVICE FOR POSITIONING RADIOGRAPHIC CASSETTES

This invention is concerned with a device for automatically correctly positioning radiographic cassettes at a station (hereafter called "operating station") preparatory to the performance of an automatic operation on the cassette or on a film therein.

There is need for such positioning devices for example in apparatus for automatically opening and loading or unloading radiographic film cassettes in work rooms under daylight or normal artificial light conditions.

The known cassette positioning devices provided in such apparatus comprise cassette locating means against which an operator must place the cassette by hand. Any misalignment of the cassette by the operator has adverse consequences for the ensuing automatic operation. For example in the case of an automatic cassette loader or unloader the operation of the cassette opening mechanism may fail to open the cassette or the radiographic film may not be correctly fed into or from the cassette by the film handling mechanism. Incorrect feeding of a film into the cassette may have the result that the cassette cannot be closed. Feeding of a film from the cassette to an automatic film processor with the film in a skewed orientation due to incorrect positioning of the cassette may result in incorrect processing or loss of correct processing conditions in the processor. This may occur for example if processing is in part controlled by signals from a detector device which is responsive to the passage of a film and which exercises a control function, e.g. processing liquid replenishment or regeneration, that may be undesirably prolonged if a film passes the detector in skewed condition.

There is also need for cassette positioning devices in apparatus for copying data onto radiographic film sheets while they are in their cassettes. Identity data are copied onto radiographic film sheets for example in medical X-ray units. If a cassette is not correctly prepositioned in relation to the so-called identification camera the radiograph may be spoiled for medical inspection purposes.

The present invention aims to provide a radiographic film cassette positioning device which is useful in conjunction with automatic cassette or film handling or processing apparatus in ensuring correct pre-positioning of a cassette without need for precise placement in the device by an operator.

According to the invention, there is provided a device for positioning a radiographic film cassette at a station (hereafter called "operating station") preparatory to the performance of an automatic operation on the cassette or on a film therein, said apparatus comprising a support on which a cassette can be laid at a receiving zone, driving means for displacing a cassette from the receiving zone to the operating station, and arrest means for arresting such cassette at that station, characterised in that the arrest means provides first and second stops disposed for contact by two contiguous mutually perpendicular edges of a cassette, and said driving means (which may include said support) incorporates a friction coupling and operates to exert on the cassette displacing forces which or components of which act towards said first and second stops and to continue to exert pressure on the cassette towards the first and/or second stop following arrest of the cassette against such stops.

An important advantage of the invention is the fact that the positioning device will bring a cassette into correct position at an operating station even if the cassette is placed in skewed conditions in the device by an operator. Another advantage is that for a period of time following correct positioning of the cassette at the operating station the device maintains locating pressure on the device. This pressure opposes any tendency for the cassette to become displaced and an automatic operation can be performed on the cassette or on any film which may be present therein, during that period of time.

In a preferred embodiment the cassette displacing means includes an endless belt conveyor. Such a conveyor can be operated continuously or in response to the presence of a cassette on the conveyor. Preferably the reach or path of the endless belt which transmits displacing force on the cassette travels in a direction which is normal to one of said stops. A thrust member may be provided on the endless belt for bearing against an edge of the cassette.

In another embodiment the cassette-displacing means includes driven cassette-supporting rollers mounted for rotation about axes which are parallel with one of the stops. Preferably each stop provides a stop surface which extends along at least a major part of the length of a cassette edge when the cassette is in correct position at the operating station. However either stop can be formed by a row of spaced elements. A direction or axis is regarded as parallel with a stop if it is parallel with the edge of a cassette when the cassette is in correct position against that stop.

In another embodiment, the cassette displacing means comprise driven rollers which are disposed with their axis perpendicular to each other and parts of which project above a surface for supporting a cassette during its displacement by such rollers. Still another embodiment comprises only one driven roller mounted with its axis at an inclination to said stops.

When the cassette manipulating apparatus is of the kind requiring the opening of the cassette, the cassette displacing means can comprises a part which exerts force on the cassette towards one of said stops and at the same time exerts releasing pressure on a cassette catch release member so that the cassette can be hinged open. This may be the case for example in a device for unloading or loading radiographic cassettes in daylight conditions.

The displacements to which the radiographic cassette is subjected may occur separately or simultaneously.

As to the stops they may form an integral unit or be composed of separate members.

The stops may be provided with cassette detecting means for controlling or initiating subsequent manipulations to which the cassette is submitted.

From the foregoing, it will be clear that a cassette which might be put upon the surface in a skew manner will automatically assume a correct alignment against the stops, irrespective of its size.

The scope and spirit of the invention will be better understood at the hand of the description of some preferred embodiments illustrated by the accompanying drawings in which.

Figures 1, 2:
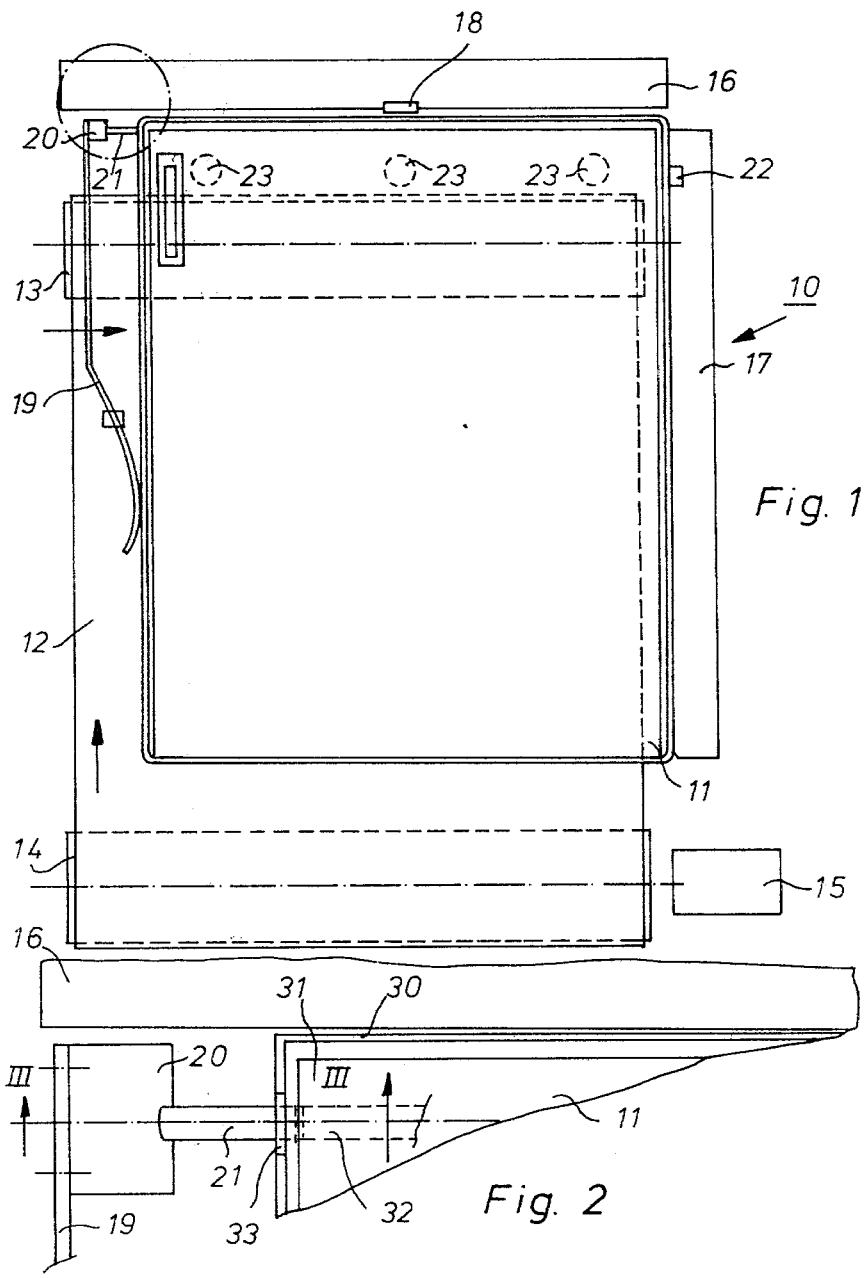
FIG. 1 is a top view of a positioning device according to the invention.
FIG. 2 is a detail of FIG. 1.

As illustrated in FIG. 1, a device 10 for positioning a radiographic cassette 11 comprises an endless belt 12 supported by two transport rollers 13,14 which are driven by motor 15.

The device 10 also comprises two mutually perpendicularly positioned stops 16 and 17 against which one side edge and the front edge of the cassette 11 must be positioned.

In stop 16 there is a microswitch 18 which is energized by the leading edge of the cassette 11 when the latter is positioned on and transported by endless belt 12.

In the embodiment of FIG. 1, the material of the endless belt is chosen in such a way that excessive friction does not occur between the endless belt 12 and the contacting surface of the cassette 11. As a consequence the contacting surfaces are not subjected to any significant wear when the endless belt 12 continues to be rotated after arrest of the cassette.

The tripping of microswitch 18 causes a motor (hereinafter described) to be energized which initiates the mechanism controlling the abutment of the cassette 11 against stop 17. This mechanism comprises a displaceable pusher 19 which is moved to push the cassette 11 towards stop 17. The lever 19 is supported by a support 20 bearing a pin 21. Due to the fact that the pusher 19 bears against a side edge of the cassette at two spaced points, the pusher ensures that the cassette will be arrested square against the stop 17. If the cassette 11 is initially introduced into the device in skewed condition it is automatically squared up. The mechanism referred to and which will be described in detail hereafter ensures correct positioning of a cassette of any size. The endless belt 12 may be stopped after the cassette reaches its correct position against stops 16 and 17. The opening cycle of a cassette opening mechanism can then be carried out.

The cassette is unlocked ready for opening, during positioning of the cassette at the operating station. This is accomplished by bearing pin 21 as hereafter referred to. The cassette opening cycle is initiated by a sensor which detects the unlocking of the cassette 11. Unlocking of the cassette by depression of a catch release member as hereafter described causes the front end of the cover or lid of the cassette 11 to lift slightly from the bottom section of the cassette so that the lid assumes a slightly inclined position. This event is detected by a sensor 22, which is an opto-electronic element in which a small light-source and a photoresponsive element is incorporated. The photoresponsive element receives the light which is reflected by the cassette cover when it is in its said slightly lifted position and the signal which is consequently generated triggers the opening cycle of the cassette 11 and stops endless belt 12. The opening of the cassette 11 may be carried out with the help of a plurality of sucker cups 23 (schematically indicated). The sensing device 22 may be of the type TIL 139 sold by Texas Instruments.

After the opening cycle of the cassette 11, such as might occur in an automatic daylight loader or unloader, or in some types of so-called identification cameras, and after the required operations have taken place, the cassette is closed again and if desired re-locked, and it is removed from the device by reverse movement of the endless belt 12. A daylight unloader for radiographic cassettes incorporating a positioning device according to the present invention is disclosed in a separate application Ser. No. 134552 filed Mar. 27, 1980 by Agfa-Gevaert N.V. for "Device for unloading radiographic cassettes in daylight".

FIG. 2 is an enlarged view of a part of the mechanism for pushing the cassette 11 against stop 17.

The cassette 11 comprises a bottom part 30 and a cover 31 which are locked together by a locking mechanism of which only the releasing pin 32 is illustrated. When the cassette 11 is correctly positioned, as is the case with the device of the present invention, the pin 21 forming part of the positioning mechanism may pass through the hole 33 provided in the bottom part 30 of the cassette and will push against the pin 32, thereby pushing the cassette against the stop 17 of FIG. 1. After the cassette 11 is arrested the positioning mechanism is capable to further advance the pin 32 to the right thereby resulting in unlocking of the cassette 11.

It will be clear that instead of the mechanism described hereinbefore other techniques for cassette unlocking may be devised which depend on the specific locking mechanism of the cassette concerned.

Figure 3:
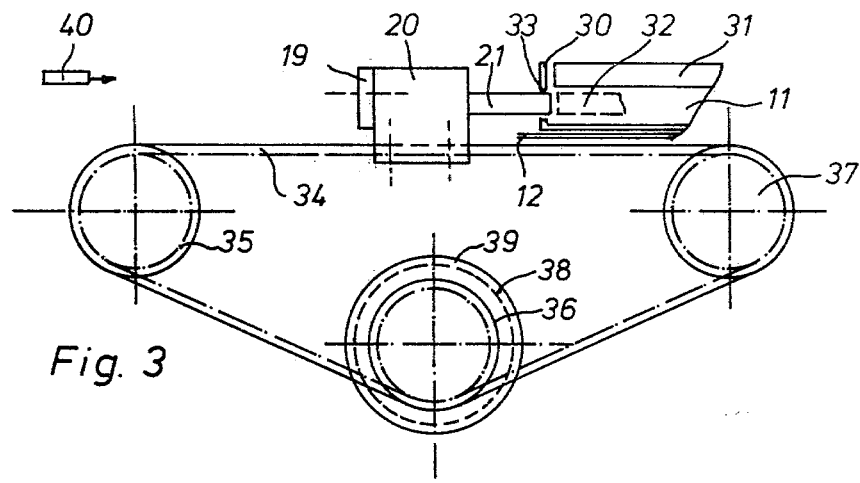
FIG. 3 illustrates the drive mechanism of the device for simultaneously unlocking the cassette.

FIG. 3 shows the mechanism of FIG. 2 looking along section line III—III.

As may be derived, the support 20 is carried by a chain or timing belt 34 which is supported by mating wheels 35, 36 and 37. The wheel 36 is driven by a motor 38 via a friction coupling 39.

As a consequence of the presence of friction coupling 39, motor 38 may keep on running while the cassette 11 is already in abutting relationship with stop 17. After the cycle to which the cassette 11 or the film contained therein was subjected has come to an end, the sense of motor 38 is reversed so that the support 20 resumes its starting position. By abutment of the support 20 against the microswitch 40, the current feeding motor 38 is cut-off.

By the presence of the friction coupling 39 no problem as to the format of the cassette 11 arises, because the action of the friction coupling 39 starts only when the cassette 11—whether or not of large size—is arrested against the stop in question stop.

An analogous mechanism as illustrated in and described with reference to FIG. 3 may be used for carrying out the abutment of the cassette 11 against stop 16.

Figure 4:
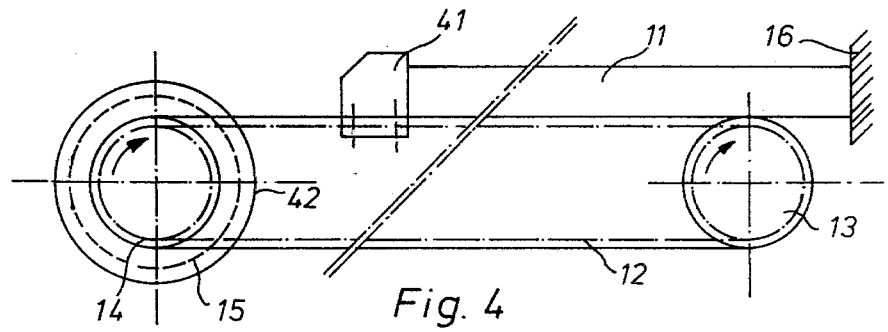
FIGS. 4, 5, 6 and 7 are alternative displacement means for the cassette.

So, the endless belt 12 in FIG. 4 is supplementarily provided with a pusher member 41 fixedly attached thereto. Upon rotation of rollers 13 and 14 in the sense indicated by the arrow, the pusher member 41 urges the cassette 11 against stop 16 (only schematically represented). The presence of a friction coupling 42 between motor 15 and driven roller 14 enables to continuously deliver a driving force to the cassette 11, so that the latter is uninterruptedly urged against stop 16. The force with which the cassette 11 is pushed against stop 16 is defined by the maximum torque delivered by motor 15 at the moment the friction coupling 42 starts slipping.

Figure 5:
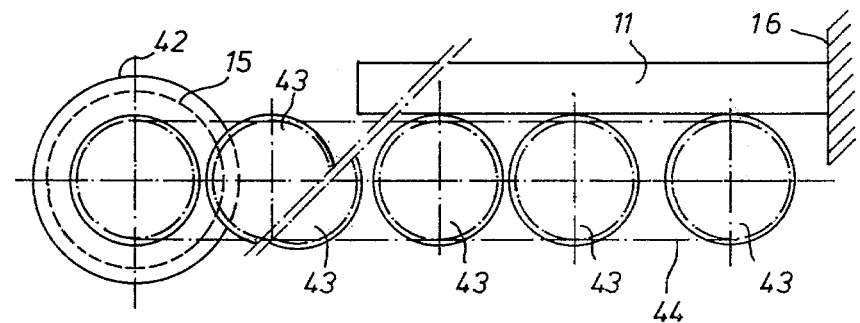

A variant of the mechanism illustrated in FIG. 4 is shown in FIG. 5. As will be seen there, the endless belt has been replaced by a plurality of rollers 43 driven by a belt 44.

Figure 6:
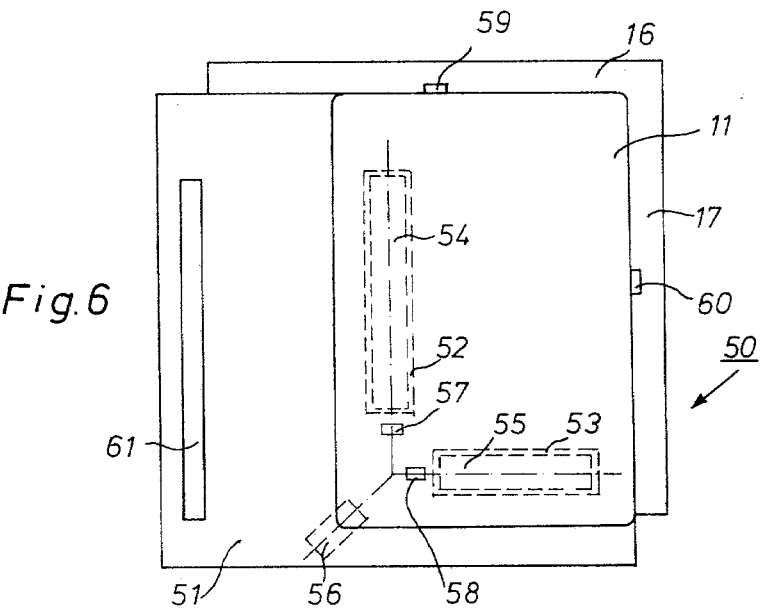

In FIG. 6 is shown another embodiment of a cassette positioning device according to the invention.

The cassette positioning device 50 comprises a platen 51 into which a pair of slots 52 and 53 are provided that are perpendicularly arranged relative to each other. Through the slots 52,53 project rollers 54 respectively 55 which are driven by motor 56 through the intermediary of slip clutches 57 and 58.

A radiographic cassette 11 which is positioned on the platen 51 is carried towards one of the stops 16 or 17 (here shown as one integral unit) and is arrested thereagainst. The continuous rotation of the other roller 54 or 55 brings also the other side of the radiographic cassette 11 against the other one of the stops 16 or 17 so that finally the radiographic cassette 11 becomes correctly aligned. The alignment may be detected by means known in the art such as microswitches 59,60 or an optoelectronic device, etc., which may be linked via an AND-gate to circuits controlling or initiating other cassette manipulations. The abutting relationship between the cassette 11 and the stops 16 and 17 is guaranteed by having the rollers 54,55 covered with a layer of a high frictional coefficient relative to the material of the cassette element contacting it and by continuously energizing the motor 56.

In so doing a driving force is always delivered by the rollers 54 and 55, so that any tendency of the cassette 11 to slide backwards is automatically compensated.

In order to limit the sidewise displacement of the radiographic cassette 11 (seen as the left side of the figure) when the operation to which it was subjected has come to an end, a supplementary guide 61 is provided. As such the cassette 11 abuts against the guide and is from then on fed straight forward.

Figure 7:
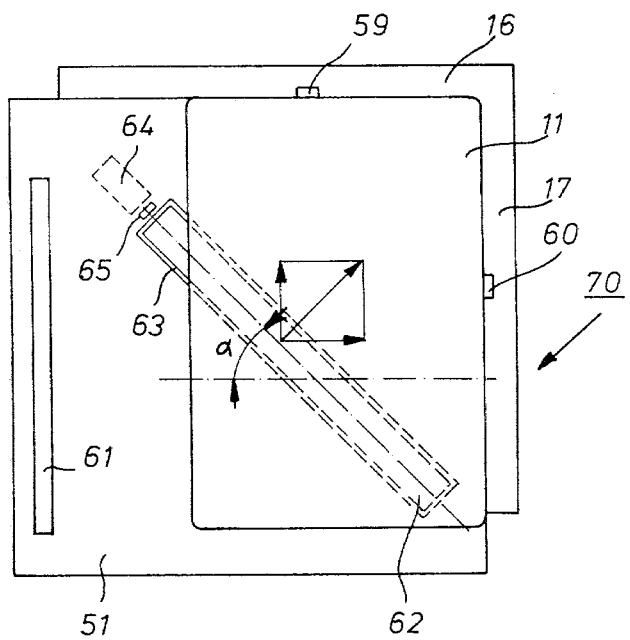

In FIG. 7 an analogous device 70 is illustrated and like parts and therefore indicated by the same reference numerals.

However, instead of two rollers partly projecting above the surface of the platen 51 only one obliquely positioned roller 62 is provided in slot 63. Roller 62 is driven by a motor 64 via a slip clutch 65 and the angle α is preferably 45 degrees.

It will be clear that the rotation of roller 62 causes a displacement of the cassette in a direction perpendicular to the roller axis. This displacement is the analogous one of simultaneous displacements perpendicularly to the stops 16 and 17. Indeed, a vector perpendicular to the axis of the roller 62 may be considered as the sum of two other ones which are perpendicular to each other and which are oriented perpendicularly to the stops 16 and 17. As a consequence, such transport mechanism is the analogue of the one illustrated in FIG. 6.

We claim:

1. Apparatus for positioning a radiographic film cassette at an operating station preparatory to the performance of an automatic operation on the cassette or on a film therein, said apparatus comprising a support on which a cassette can be placed at a receiving zone, driving means associated with said support for advancing a cassette from said receiving zone to the operating station, arrest means for arresting further movement of such cassette upon reaching that station, said arrest means including front edge and side edge stops disposed for contact by two contiguous mutually perpendicular edges of a cassette, said driving means incorporating a friction coupling and acting to urge the cassette towards said front edge stop and to continue to exert pressure on the cassette towards the front stop following arrest of the cassette against such stop, sensing means associated with said front edge stop for sensing the arrival of the cassette front edge in the proximity to said front edge stop, and positive displacing means operative in response to the actuation of said sensing means to engage said cassette said remote from said side edge stop and displace said cassette bodily in a direction generally orthogonal to its driving direction against said side edge stop, whereby said cassette is accurately aligned at said operating position.

2. A device according to claim 1, wherein the cassette-driving means includes an endless belt conveyor.

3. A device according to claim 2, wherein the path of said belt conveyor in advancing the cassette is normal to said front edge stop.

4. A device according to claim 2, wherein said endless belt is provided with a thrust-transmitting element for bearing against an edge of the cassette.

5. A device according to claim 1, wherein the cassette-driving means includes slippingly driven cassette-supporting rollers mounted for rotation about axes which are parallel with said front edge stop.

6. A device according to claim 5, wherein at least the surface of said rollers is formed by material providing a high coefficient of friction between such surface and a cassette.

7. A device according to claim 1, wherein said cassette includes a releasing member for opening the cover thereof, and the orthogonal cassette-displacing means comprises means operative concurrently with the sidewise displacement of cassette towards said side edge stop to exert releasing pressure on said cassette releasing member so that the cassette cover can then be opened.

8. A device according to claim 1, including sensing means associated with said side edge stop for sensing when a cassette is in position thereagainst and initiate said automatic operation.

9. The apparatus of claim 1, wherein said orthogonally acting positive displacing means includes members spaced apart in a direction perpendicular to said front edge stop whereby said positive displacing means engages said cassette side at two spaced apart points along the edge thereof upon displacing the cassette toward said side edge stop.

* * * * *

UNITED STATES PATENT OFFICE
CERTIFICATE OF CORRECTION

Patent No. 4,329,589                    Dated    May 11, 1982

Inventor(s)  Emile F. Stievenart et al

It is certified that error appears in the above-identified patent and that said Letters Patent are hereby corrected as shown below:

In the Claims:

Claim 1, column 6, line 14, "said cassette said" should read -- said cassette side --.

Signed and Sealed this

Twenty-second Day of June 1982

[SEAL]

Attest:

GERALD J. MOSSINGHOFF

Attesting Officer     Commissioner of Patents and Trademarks